(12) United States Patent
Chataignier et al.

(10) Patent No.: US 11,262,855 B2
(45) Date of Patent: Mar. 1, 2022

(54) METHOD FOR CONFIGURING A MOUSE COMPRISING AT LEAST FOUR AXES

(71) Applicant: LEXIP, La Ravoire (FR)

(72) Inventors: Lionel Chataignier, La Ravoire (FR); Geoffrey Chataignier, La Ravoire (FR); Léo Giorgis, La Ravoire (FR); Hugo Loi, La Ravoire (FR)

(73) Assignee: LEXIP, La Ravoire (FR)

( * ) Notice: Subject to any disclaimer, the term of this patent is extended or adjusted under 35 U.S.C. 154(b) by 0 days.

(21) Appl. No.: 16/966,927

(22) PCT Filed: Feb. 1, 2019

(86) PCT No.: PCT/EP2019/052497
§ 371 (c)(1),
(2) Date: Aug. 3, 2020

(87) PCT Pub. No.: WO2019/149886
PCT Pub. Date: Aug. 8, 2019

(65) Prior Publication Data
US 2021/0048899 A1     Feb. 18, 2021

(30) Foreign Application Priority Data

Feb. 2, 2018 (FR) ...................................... 1850887

(51) Int. Cl.
*G06F 3/0346* (2013.01)
*G06F 3/0338* (2013.01)
(Continued)

(52) U.S. Cl.
CPC .......... *G06F 3/0346* (2013.01); *G06F 3/0338* (2013.01); *G06F 3/03543* (2013.01); *G06F 3/04812* (2013.01)

(58) Field of Classification Search
CPC .. G06F 3/0346; G06F 3/03543; G06F 3/0354; G06F 3/0383; G06F 2203/0384; A63F 2300/105; A63F 13/211
(Continued)

(56) References Cited

U.S. PATENT DOCUMENTS

| 8,711,095 B2 * | 4/2014 | Tan ...................... G06F 3/03543 345/163 |
| 2006/0176275 A1 * | 8/2006 | Delattre .............. G06F 3/03543 345/163 |

(Continued)

FOREIGN PATENT DOCUMENTS

FR             3025902 A1     3/2016

OTHER PUBLICATIONS

International Search Report and Written Opinion dated Apr. 5, 2019 in counterpart application No. PCT/EP2019/052497; w/English partial translation and partial machine translation (total 27 pages).

(Continued)

*Primary Examiner* — Koosha Sharifi-Tafreshi
(74) *Attorney, Agent, or Firm* — Seckel IP, PLLC

(57) ABSTRACT

A method for configuring a mouse (1) for a computer (101), the mouse (1) comprising at least four degrees of freedom and being able to transmit one data signal (31) for each degree of freedom of the mouse (1), includes (i) defining a first data signal (31) able to be sent by the mouse (1), the first data signal (31) being chosen from a first list via a human-machine interface, the human-machine interface especially comprising a computer (101) and a screen (102), (ii) defining a first condition (32) relating to the first data signal (31), the first condition (32) being chosen from a second list via the human-machine interface, and (iii) defining a first (Continued)

instruction (33) able to be executed by a computer (101), the first instruction (33) being chosen from a third list via the human-machine interface.

25 Claims, 3 Drawing Sheets

(51) Int. Cl.
    *G06F 3/0354*     (2013.01)
    *G06F 3/04812*     (2022.01)

(58) Field of Classification Search
    USPC .................................................. 345/158, 163
    See application file for complete search history.

(56) References Cited

U.S. PATENT DOCUMENTS

| | | | |
|---|---|---|---|
| 2015/0205466 A1* | 7/2015 | Han | G06F 3/03543 715/835 |
| 2016/0077589 A1* | 3/2016 | Chataignier | G06F 3/03543 345/163 |

OTHER PUBLICATIONS

Evoluent, "Evoluent mouse manager", https://web.archive.org/web/20160325082228/https://evoluent.com/download/Win_Mouse_Manager_Instructions.pdf, Mar. 25, 2016 (in English; tot al 6 pages) (D1 cited in the ISR).

Anonymous, "Adding mouse-clicks and timing-delays to macros", https://support.logitech.com/en us/article/21597?product=a0qi00000069vCHAAY#click, Aug. 31, 2014 (in English; total 18 pages) (D2 cited in the ISR).

Jitbit Software, "Jitbit Macro Recorder tutorial", Youtube, https://www.youtube.com/watch?v=PESMywgMBSk, Oct. 5, 2012 (in English; total 1 page) (D3 cited in the ISR).

TheMagiccMushroom, "*2016* Logitech G Series: Macro Tutorial", Youtube, https://www.youtube.com/watch?annotation id=annotation 3054888149&feature=iv&srcvTd=pqjs9ytm69c&v=7QmiCgFmE5Y, Sep. 4, 2016 (in English; total 1 page) (D4 cited in the ISR).

* cited by examiner

METHOD FOR CONFIGURING A MOUSE COMPRISING AT LEAST FOUR AXES

TECHNICAL FIELD OF THE INVENTION

The invention relates to a method for configuring a mouse comprising at least four axes or "degrees of freedom" and allowing a computer application such as a piece of three-dimensional software or a video game to be controlled.

PRIOR ART

To use certain pieces of three-dimensional software, such as pieces of computer-assisted-design software or indeed to play certain video games, it is known to use an advanced mouse comprising at least four degrees of freedom (in other words four axes), of even six degrees of freedom. Such a mouse comprises a base bearing a casing in order to form an assembly that is movable translationally in a plane along two horizontal perpendicular axes, just like standard so-called two-dimensional mice. The casing of such a mouse is movable with respect to the base, so as to be able to be inclined by rotation about a longitudinal horizontal axis, and by rotation about a transverse horizontal axis, thereby achieving two additional axes. As a variant or in addition, the mouse may comprise on one side of the mouse a lever that protrudes and that is able to be actuated by a thumb of a user, this achieving yet two more additional axes. The mouse may send at least as many data signals as it possesses degrees of freedom, this enabling particularly advanced possibilities with respect to control of pieces of software or video games.

Such a mouse is advantageous in that it enables more varied uses than a simple conventional two-dimensional mouse. However, it requires dexterity to manipulate it and is complex to parameterize; hence, its functionalities are not always exploited in full by its user.

SUBJECT OF THE INVENTION

The aim of the invention is to provide a method for configuring a mouse comprising at least four degrees of freedom that remedies the above drawbacks and that improves the methods for configuring such mice known in the prior art.

The invention relates to a method for configuring a mouse for a computer, the mouse comprising at least four degrees of freedom and being able to transmit one data signal for each degree of freedom of the mouse, the configuring method comprising:
- a first step of defining a first data signal able to be sent by the mouse, the first data signal being chosen from a first list via a human-machine interface, the human-machine interface especially comprising a computer and a screen,
- a second step of defining a first condition relating to the first data signal, the first condition being chosen from a second list via the human-machine interface, and
- a third step of defining a first instruction able to be executed by a computer, the first instruction being chosen from a third list via the human-machine interface.

The configuring method may comprise:
- a fourth step of defining a second data signal able to be sent by the mouse, the second data signal being chosen from the first list via the human-machine interface, and/or
- a fifth step of defining a second condition relating to the first data signal or to the second data signal, the second condition being chosen from the second list via the human-machine interface, and/or
- a sixth step of defining a second instruction able to be executed by the computer, the second instruction being chosen from the third list via the human-machine interface.

Said third list may comprise:
- an instruction to move a pointer over a screen in a direction given by a first and/or a second data signal, and/or
- an instruction to move a pointer over a screen by a distance given by a third and/or a fourth data signal, and/or
- an instruction to move a pointer over a screen to a position stored in memory beforehand.

The configuring method may comprise a step of defining an execution condition, said first instruction and/or said second instruction being able to be executed by a computer provided that the execution condition is validated.

The configuring method may comprise a step of displaying, on a screen, a flowchart in which said first and/or said second data signal is represented by a first figure, said first and/or said second condition is represented by a second figure, and said first and/or said second instruction is represented by a third figure.

The configuring method may comprise a step of moving, over the screen, said first figure and/or third figure, by means of the mouse.

Said second figure may be an arrow and the configuring method may comprise a step of creating said arrow by means of the mouse, a first end of the arrow being joined to the first figure, a second end of the arrow being joined to the third figure.

The invention also relates to a method for using a mouse for a computer, the mouse comprising at least four degrees of freedom and being able to transmit one data signal for each degree of freedom of the mouse, the using method comprising:
- a step of storing a configuration of the mouse, which configuration is obtained using the configuring method such as defined above, and
- a step of executing said first and/or said second instruction consecutively to the validation of said first and/or said second condition.

The using method may comprise:
- a step of storing an identifier of a piece of software, and
- a step of associating this identifier with a configuration of the mouse, which configuration is obtained using the configuring method such as defined above.

The invention also relates to a computer system comprising a computer, a screen and a mouse comprising at least four degrees of freedom and being able to transmit a data signal to the computer, the computer system comprising means for implementing the configuring method such as defined above and/or the using method such as defined above.

The mouse may comprise at least two buttons, preferably at least three buttons and especially four buttons and/or the mouse may comprise at least six degrees of freedom.

The mouse may comprise a base and a top casing that are joined to each other by a joining device that permits the top casing to incline with respect to the base and/or in that the mouse may comprise a lever that protrudes from a flank of the mouse and that is able to be actuated by a thumb of a user.

The invention also relates to a computer-program product comprising instructions that, when the program is executed by a computer, lead the latter to implement the configuring method such as defined above and/or the using method such as defined above.

The invention also relates to a data storage medium that is readable by a computer, the medium containing instructions that, when they are executed by a computer, lead the latter to implement the configuring method such as defined above and/or the using method as such as defined above.

BRIEF DESCRIPTION OF THE DRAWINGS

The subject matter, features and advantages of the present invention will be explained in detail in the following description of one particular non-limiting embodiment, which is given with reference to the appended figures, in which.

DESCRIPTION OF ONE EMBODIMENT

Figure 1:
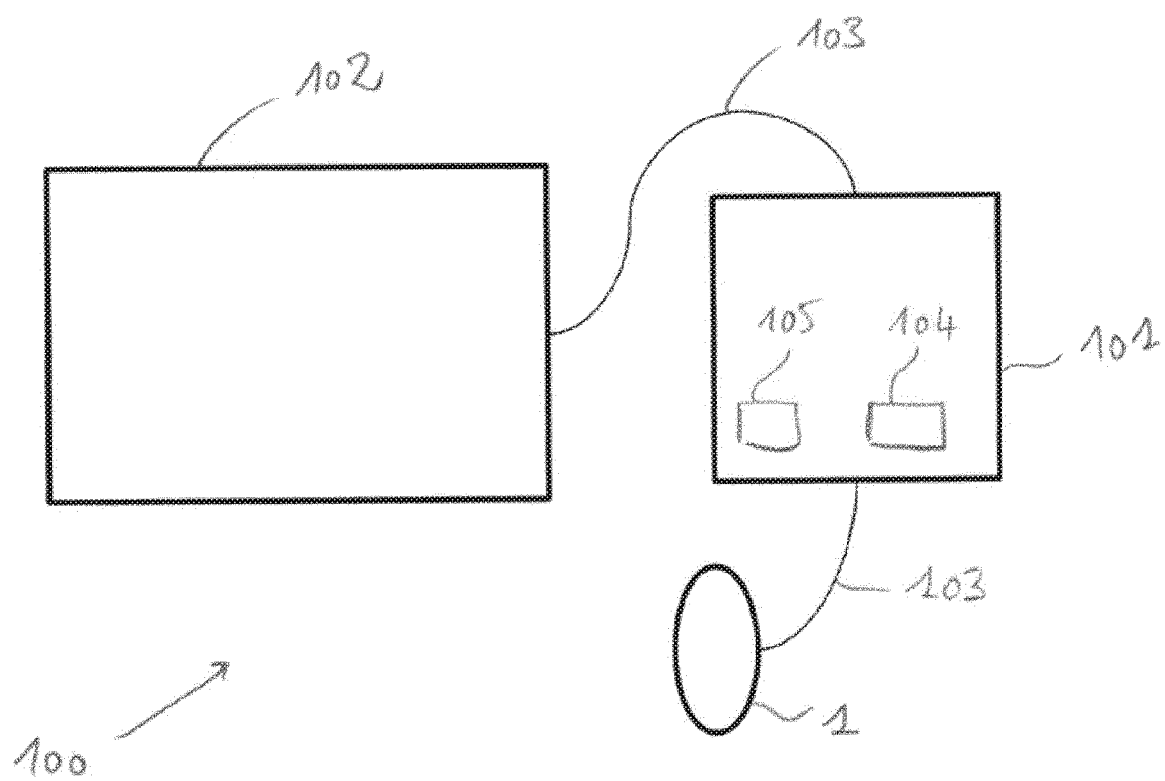
FIG. 1 is a symbolic view of a computer system according to one embodiment of the invention.

FIG. 1 illustrates a computer system 100 comprising a computer 101, a mouse 1 and a screen 102, the screen and the mouse being connected to the computer 101. By "connected", what is meant is that these elements are connected to one another so as to be able to exchange data. Although shown by linking lines 103 in FIG. 1, these links may be wireless links. The computer 101 comprises a memory 104 and a microprocessor 105, which is especially able to process the data signals sent by the mouse 1. The screen is able to project an image containing a pointer (in other words, a cursor) that may be moved over the screen by actuating the mouse. The screen and the mouse together form a human-machine interface allowing the user to exchange data with the computer.

Figure 2:
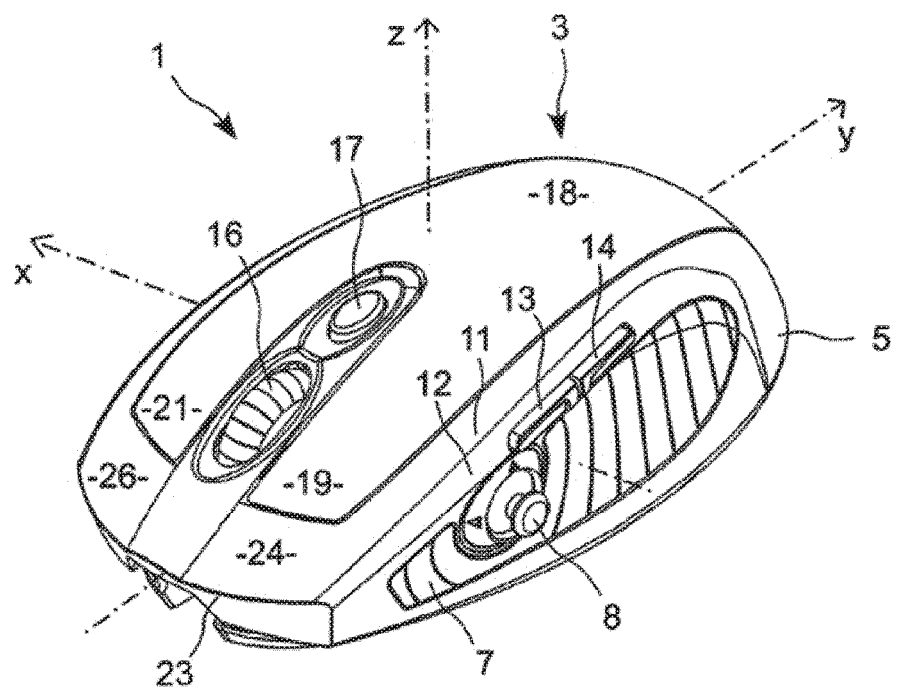
FIG. 2 is a three-dimensional view from above of a six-axis mouse.
Figure 3:
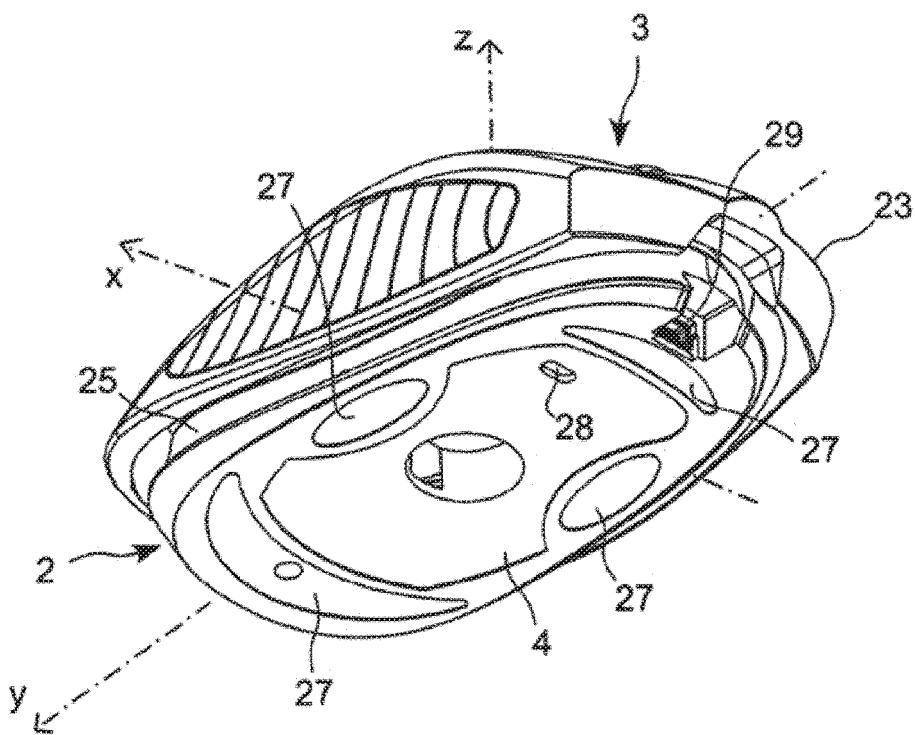
FIG. 3 is a three-dimensional view from below of the mouse.

As may be seen in FIGS. 2 and 3, the mouse 1 comprises a base 2 bearing a top casing 3 that has a curved general shape favoring handling by the user. The base 2 has a planar bottom face 4 via which it bears against a substantially horizontal plane, such as a table or a mouse mat, which is represented by the two perpendicular horizontal axes x and y. The mouse 1 is therefore movable translationally in this horizontal plane along the two perpendicular horizontal axes x and y. It is also rotatable about an axis normal to this plane, namely the yaw axis z. The top casing may for its part be inclined with a roll movement with respect to the base via a pivoting movement about the horizontal transverse axis x, and it may be inclined with a pitch movement via a pivoting movement about the horizontal longitudinal axis y.

The top casing 3 of the mouse 1 is joined to the base 2 by a joining element (not shown) that may be a solid part made of rubber or the like having what is said to be a diablo or biconical external general shape. This joining element or diablo extends in the vertical direction z and comprises a bottom end via which it is rigidly fastened to the base 2, and a top end via which it is rigidly fastened to the top casing 3. This joining element may allow the top casing 3 to pivot with respect to the base 2 about the two axes x and y. In the illustration shown in the figures, the axes x, y and z form the axes of an indirect orthogonal co-ordinate system each axis of which passes through the center of symmetry C of the diablo. It will be noted that the joint between the base and the top casing prevents a movement of the top casing vertically with respect to the base, and a rotational movement about the axis z of the top casing with respect to the base. The rotation of the top casing 3 with respect to the base 2 about the axis z is especially prevented by the fact that the base 2 and the top casing 3 have shapes that partially interlock with each other when the assembly is assembled, with a certain amount of play along the axes x and y, this allowing the top casing to be inclined while preventing it from pivoting with respect to the base about the axis z.

Generally, the top casing 3 comprises a casing body 5 that bears a set of actuators and a printed circuit board called the top printed circuit board, which is rigidly fastened to this casing body. The casing body 5 comprises a left lateral flank 7, against which the thumb of a user grasping the mouse presses. This left lateral flank 7 comprises a lever 8, which is located near the front and extends in a direction substantially parallel to the axis x, so as to be manipulatable by the thumb of the user. The lever 8 is rotatable about the vertical axis z and about the transverse axis y. The casing body 5 also comprises a curved top face 11, which bounds, conjointly with the left lateral flank 7, a blunt edge 12 bearing two push buttons 13 and 14 that are located substantially half way along the left lateral flank 7, and that are also actuatable by the thumb of the user. The front top portion of the casing body bears a rotatable thumbwheel 16 that is manipulatable by the middle or index finger of the user having the mouse in his hand, and an additional push button 17 located above the thumbwheel 16, and that the user may also actuate with his middle or index finger. As a variant, the mouse could comprise a higher or lower number of buttons or actuators and/or these buttons could be positioned differently on the mouse. For example, a mouse analog to the one that is described here could be obtained by symmetry, so as to make it suitable for left-handed people.

The curved top face 11 of the casing body 5 is covered with a curved and supple additional plate 18, the front portion of which comprises two branches 19 and 21 located on either side of the thumbwheel 16 and the push button 17. These two branches 19 and 21 form a so-called left-click button and a so-called right-click button that are actuatable by the index finger and by the middle finger of a right-handed person having the mouse in his hand, respectively. As may be seen in FIG. 1, the two branches 19 and 21 are spaced apart from the front end of the casing body 5, which is here especially embodied by a front edge 23 having a curved shape that is oriented transversely. The edge 23 is thus separated longitudinally from each of these buttons 21 and 22 by two bearing regions that are referenced 24 and 26, these bearing regions forming an integral part of the front of the casing body 5, respectively. The fact that the left- and right-click buttons are separated from the front end of the top casing by two bearing regions 24 and 26 allows the user to incline the top casing rollwise by exerting forces on these bearing regions 24 and 26 directly, i.e. without running the risk of clicking involuntarily. As regards the base 2, it too comprises a base body 25 holding a printed circuit board called the bottom printed circuit board and various components. As may especially be seen in FIG. 3, the bottom face 4 of this base body is equipped with a set of glides 27 that make it easier to slide. It is moreover equipped with a laser movement sensor, referenced 28, by virtue of which the translational movements along the axes x and y with respect to the holder are measured. Moreover, this base 2 comprises, in its front portion, a mini-USB connector 29, by virtue of which the mouse may be connected to a computer so as to transmit its data, and/or so as to recharge a battery integrated into this mouse in order to allow it to exchange data with the computer via a wireless link.

The printed circuit board called the bottom printed circuit board is rigidly fastened to the base and itself bears various components including an accelerometer called the bottom accelerometer, which is rigidly fastened to this printed circuit board. This bottom printed circuit board also bears components specific to the mini-USB connector, to the laser sensor 28, and to other constituents. Analogously, the printed circuit board called the upper printed circuit board is rigidly fastened to the casing body 5. This top printed circuit board bears an accelerometer, called the top accelerometer, which is also securely fastened to the printed circuit board that bears it, and a set of components specific to the thumbwheel 16, to the lever 8 and to the push buttons 13, 14, 17. These two printed circuit boards are electrically connected to each other by a connector, in such a way that data generated by the top printed circuit board, such as the depressed state of either of the left- and right-click buttons, the position of the wheel 16 or even the position of the lever 8, are transmitted to the bottom printed circuit board.

The two accelerometers are conjointly exploited by a computing unit, such as a microcontroller, with which for example the bottom printed circuit board is equipped, to determine the inclination of the top casing 3 with respect to the base 2.

The two accelerometers are advantageously identical electronic components, so as to simplify the processing of the signals that they deliver. It is advantageously a question of accelerometers taking the form of the MEMS-based electronic components referenced LIS331 DLH sold by ST®. Each accelerometer delivers signals representative of the accelerations that it experiences along three orthogonal axes that are specific thereto, and these signals are addressed to the microcontroller with which the bottom printed circuit board is equipped. The signals output from the accelerometers are processed by the microcontroller to determine the inclination of the top casing 3 with respect to the base 2, on the one hand about the axis x, and on the other hand about the axis y. To this end, the microcontroller continuously collects signals representative of the acceleration experienced by the top accelerometer and by the bottom accelerometer along the axis x.

Finally, the mouse is able to transmit six data signals to the computer 101, each signal corresponding to one degree of freedom of the mouse, to which signals are added binary data signals for each of the buttons of the mouse and for the thumbwheel. A first data signal contains data relating to the translational movement of the mouse parallel to the transverse axis x. A second data signal contains information relating to the translational movement of the mouse parallel to the longitudinal axis y. A third data signal contains information relating to the rotation of the top casing about the transverse axis x. A fourth data signal contains information relating to the rotation of the top casing about the longitudinal axis y. A fifth data signal contains information relating to the rotation of the lever 8 about the vertical axis z. A sixth data signal contains information relating to the rotation of the lever 8 about the longitudinal axis y.

The computer comprises a piece of software for parameterizing (in other words configuring) the mouse, which acts as a filter between the data signals transmitted by the mouse and the data received by other pieces of software or applications of the computer. The piece of parameterizing software allows the data signals output from the mouse to be converted into signals that are directly exploitable by the various other pieces of software. The piece of software for parameterizing is stored in the memory 104 of the computer and may be executed by its microprocessor 105.

For example, the mouse may be used to control a piece of software allowing a three-dimensional object to be displayed, such as for example a piece of computer-assisted-design software. The rotation of the top casing 3 of the mouse with respect to the base 2 may be associated with a command to rotate the three-dimensional object displayed on the screen. Thus, the user may make this object pivot about two perpendicular axes in order to observe it from all angles. The rotation of the lever 8 may for example be associated with a command to translate the three-dimensional object displayed on the screen. Thus, the user may move this object in the plane of the screen by manipulating the lever 8 with his thumb.

Lastly, the movement of the pointer on the screen may be associated with the movement of the mouse over a plane, as is the case when a conventional mouse is used. Thus, the user may also use the mouse to select various options and commands of the piece of software. Thus, by virtue of the mouse and of the piece of dedicated parameterizing software, the user may interact with a piece of three-dimensional software using the mouse exclusively or almost exclusively whereas before it was necessary to combine use of the mouse with one hand and use of a keyboard with the other hand. Therefore, use of such pieces of software is made more accessible: it is possible to use them with computer systems devoid of keyboard. These pieces of software are also made accessible to handicapped people unable to use one arm or one hand and who therefore can only use their other hand to work or play. Or indeed, the user may employ his other hand to generate other commands, thereby allowing a computer to be used more effectively. Of course to manipulate a three-dimensional object the mouse may be parameterized in other ways than that just presented.

The piece of parameterizing software may comprise one or more predefined configurations specific to use of certain applications or pieces of software. The user may also modify an existing configuration or create a new configuration usable for all the applications of the computer or for a selection of applications of the computer. To this end, the user is provided with an interface such as a configuration panel. The piece of software for parameterizing the mouse implements a method for configuring the mouse. This configuring method comprises various steps that will now be described in detail.

In a first step, a first data signal 31 able to be sent by the mouse is defined, or in other words selected, the first data signal 31 being chosen from a first list. By way of example, the first list may contain all or some of the following data signals:
  a translation of the mouse parallel to the transverse axis x, and/or
  a translation of the mouse parallel to the longitudinal axis y, and/or
  any translation of the mouse, and/or
  a rotation of the top casing about the transverse axis x, and/or
  a rotation of the top casing about the longitudinal axis y, and/or
  any rotation of the top casing, and/or
  a rotation of the lever 8 about the vertical axis z, and/or a rotation of the lever 8 about the longitudinal axis y, and/or any rotation of the lever 8, and/or an activation of the push button 13, and/or an activation of the push button 14, and/or an activation of the push button 17, and/or an activation of the thumbwheel 16, and/or an activation of the left-click button, and/or an activation of the right-click button.

The selection may for example be made using the mouse, for example by clicking on the desired data signal in a drop-down menu.

In a second step, a first condition 32 relating to the first data signal 31 is defined, the first condition 32 being chosen from a second list. This second list may be different for each data signal selected in the first step. For example, if the data signal selected in the first step is "any rotation of the top casing", then the condition may be "a rotation of the top casing 4 larger than a given angle" or indeed "a rotation of the top casing 4 in the direction of a given angular sector", for example "an inclination of the top casing forwards" or indeed "an inclination of the top casing to the right". The definition of the first condition 32 may optionally be completed by inputting a numerical value. According to another example, if the data signal selected in the first step is an activation of one of the buttons of the mouse, then the associated condition may be "a press on said button". Lastly, the user has the ability to define a condition as being systematically met, i.e. the condition is systematically validated.

In a third step, a first instruction 33 able to be executed by a computer is defined, the first instruction 33 being chosen from a third list. This third list may contain actions habitually performed with the mouse, with a keyboard, or even a combination of actions performed with the keyboard and mouse. For example, the third list may contain:

an instruction producing the effect of a press on any one of the keys of a keyboard, and/or an instruction producing the effect of a simultaneous press on a plurality of keys of the keyboard, and/or an instruction to move the pointer over the screen in a direction given by a first and/or second data signal or in a predefined direction, and/or an instruction to move a pointer over a screen by a distance given by a third and/or fourth data signal or by a predefined distance, and/or an instruction to move a pointer over a screen to a position stored in memory beforehand.

The instruction 33 may be defined to be executed a single time or indeed provided that an execution condition is validated. This execution condition may for example be a temporal condition, i.e. the instruction will be repeated or prolonged for a given amount of time. The execution condition may also be a condition relating to a data signal: i.e. the instruction will be repeated or prolonged provided that a given data signal validates the execution condition, for example "provided that one of the buttons of the mouse remains pressed" or "provided that the upper casing remains inclined beyond a certain angle". Lastly, the execution condition may also relate to a predefined number of executions of the same instruction. The definition of the instruction 33 may optionally be completed by inputting a numerical value.

In the first, second and third steps, a first flowchart 30, in other words a first block diagram, is displayed on the screen, in which flowchart:

the data signal 31 defined in the first step is represented by a first figure, the condition 32 defined in the second step is represented by a second figure, the instruction 33 defined in the third step is represented by a third figure.

Figure 4:
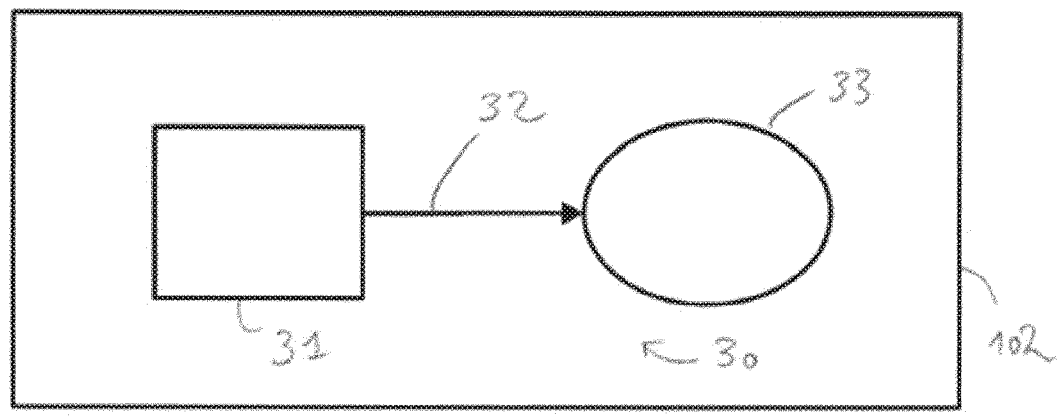
FIG. 4 is a schematic view of a first mouse configuration flowchart.

FIG. 4 schematically illustrates a screen on which is displayed the first flowchart 30. In the example of FIG. 4, the first figure is a rectangle, the second figure is an arrow and the third figure is an oval 33. These shapes could nevertheless be different. Thus a schematic representation of the parameterization, or in other words of the configuration, of the mouse is thus provided. Advantageously, when an execution condition is associated with an instruction, a symbol such as for example a symbol representing a cycle (a circular shape with an arrow or a triangular shape with an arrow) may appear in the corresponding figure. The parameterization obtained is visual and therefore easy to understand and carry out by anyone, whether they have specific knowledge of programming or not.

Advantageously, the first flowchart 30 is created graphically. To define a data signal 31 according to the first step, the first figure is moved from a first region of the screen to a second region of the screen. The first region of the screen is a selection region in which various figures are arranged. The second region of the screen is an active region in which the first flowchart is defined. The user slides the first figure from the first region to the second region via a so-called "drag and drop" movement, i.e. he clicks on the first figure in the first region, keeps the button pressed down, moves the figure from the first region to the second region, then releases the button in the location where he would like to drop the first figure. In the same way, the user defines an instruction 33 according to the third step, by moving the third figure from the first region to the second region. The definition of the data signal 31 or of the instruction 33 may be completed by making a choice from a context menu that appears when the figure in question is clicked on. To define a condition 32 according to the second step, the user clicks with a button on an edge of the first figure and releases the button when the pointer is on an edge of the third figure. This gesture causes an arrow to be drawn from the first figure to the third figure. The condition may then be precisely defined by accessing a context menu, for example by clicking on the arrow. As a variant, the graphical creation of the first flowchart 30 could be achieved differently.

It will therefore be understood that the flowchart is displayed while the first, second and third steps are carried out. In other words, the flowchart 30 is displayed on the screen as it is created. The second step is carried out after the first step and after the third step.

Figure 5:
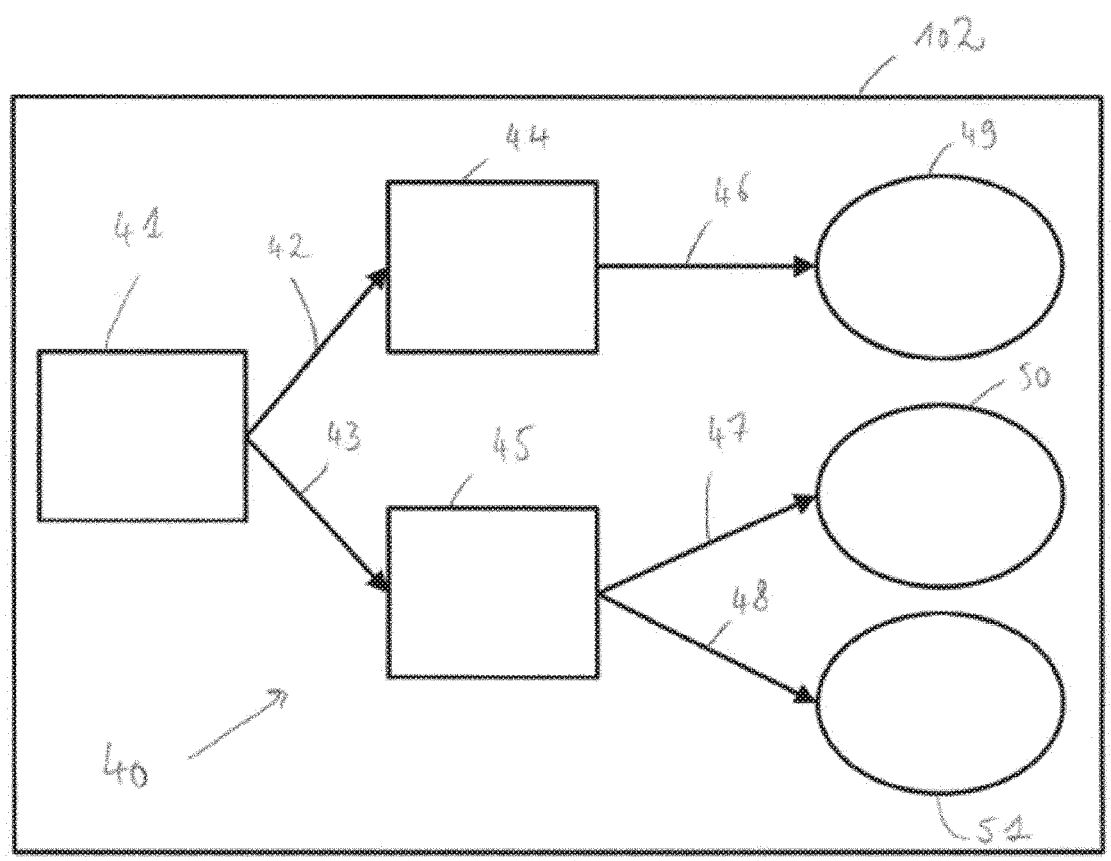
FIG. 5 is a schematic view of a second mouse configuration flowchart.

The first, second and third steps may each be repeated as many times as necessary, to produce more complex flowcharts such as, for example, the second flowchart 40, which is shown in FIG. 5. Two different or even identical conditions may be associated with the same data signal, to give rise to two different instructions.

In the second flowchart 40, which is illustrated in FIG. 5, three data signals 41, 44, 45 are defined. The first data signal 41 is defined as "any rotation of the top casing". The second data signal 44 is defined as "any rotation of the lever 8". The third data signal 45 is defined as "a press on any of the buttons of the mouse".

Three instructions 49, 50, 51 are also defined. The first instruction consists in "a movement of the cursor of the mouse in the direction 49 given by the inclination of the top casing by a distance proportional to the inclination of the lever 8". The second instruction 50 consists in "a press on the key "A" of the keyboard". The third instruction 51 consists in "a simultaneous press on the key "Ctrl" and on the key "A" of the keyboard".

Five conditions 42, 43, 46, 47, 48 are also defined according to the schema of FIG. 5. The first condition 42, which is defined between the data signal 41 and the data signal 44, is met if "the top casing is pivoted rearward". The second condition 43, which is defined between the data signal 41 and the data signal 45, is met if "the top casing is pivoted forward". The third condition 46, which is defined between the data signal 44 and the instruction 49, is systematically met. The fourth condition 47, which is defined between the data signal 45 and the instruction 50, is met if "no click is detected on any of the buttons". The fifth condition 48, which is defined between the data signal 45 and the instruction 51, is met if "an activation of the right-click button of the mouse is detected".

The configuration of the mouse is stored in the memory 104 of the computer. As a variant, the mouse could also comprise a specific memory in which this configuration would be stored. This would allow actions defined via the flowchart to be executed directly by means of a USB protocol and without reprocessing by a piece of software running on the computer, which would substantially decrease action latency. Thus a mouse configuration is obtained that may be assigned to one application in particular or indeed to all of the applications of the computer. To do this, the identifier of one or more applications may be associated with the previously defined configuration. It is possible to repeat the described method to obtain different mouse configurations that may be freely assigned to the applications of the computer.

When the computer is used, the microprocessor 105 of the computer activates the one or more mouse configurations depending on the application being used. It verifies whether the predefined conditions of these configurations are validated. If such is the case, it executes the instructions such as defined in these configurations.

By virtue of this method for configuring the mouse, a user may convert a generic mouse into a mouse that is specially adapted to the pieces of software that he uses, to the operations that he commonly performs, or even to the dexterity that he possesses. Advantageously, the configuring method requires no knowledge of programming and is particularly intuitive by virtue of the visual interface described above. Complex mouse configurations may be defined without the user having to write a single line of computer code. In addition, the mouse may be configured solely by means of the mouse itself, this being particularly consistent with the use that is made thereof. The mouse may be configured with a computer system devoid of keyboard and by handicapped people unable to use one arm or one hand and who therefore can only use their other hand to work. Although the mouse makes many actions possible, it remains simple to parameterize or to configure.

A parameterization of the mouse specific to certain video games may also be defined. For example, for the video game "League of Legends®" or for similar video games, a particular parameterization allows a succession of commands to be sent to a playable character controlled by the player. Use of a conventional mouse to control a playable character of the video game would require many clicks and many movements of the mouse, which would have to be performed at high speed, whereas the mouse according to the invention allows the same result to be achieved even more rapidly and in a way that is less stressful for the player. The mouse may also advantageously be parameterized for use with the video game "Minecraft®" or for similar video games so as to efficiently duplicate some of the virtual and three-dimensional constructions of this game. Advantageously, the initial position of the cursor on the screen is stored in memory before the instructions defined in a flowchart are executed. When all the instructions have been executed, the cursor is repositioned in its initial position.

The invention claimed is:

1. A method of configuring a mouse for a computer, the mouse comprising at least four non-binary degrees of freedom relative to at least four geometric axes and being adapted to transmit a non-binary data signal for each non-binary degree of freedom of the mouse, the method comprising:
    defining a non-binary first data signal adapted to be sent by the mouse, the first data signal being chosen from a first list via a human-machine interface,
    defining a first condition relating to the first data signal, the first condition being chosen from a second list via the human-machine interface, and
    defining a first instruction adapted to be executed by a computer, the first instruction being chosen from a third list via the human-machine interface.

2. The configuring method as claimed in claim 1, further comprising at least one of the following:
    defining a non-binary second data signal able to be sent by the mouse, the second data signal being chosen from the first list via the human-machine interface,
    defining a second condition relating to the first data signal or to the second data signal, the second condition being chosen from the second list via the human-machine interface,
    defining a second instruction adapted to be executed by the computer, the second instruction being chosen from the third list via the human-machine interface.

3. The configuring method as claimed in claim 1, wherein the third list comprises at least one of the following:
    an instruction to move a pointer over a screen in a direction given by at least one selected from the group consisting of the first data signal and a non-binary second data signal,
    an instruction to move a pointer over a screen by a distance given by at least one selected from the group consisting of a non-binary third data signal and a non-binary fourth data signal,
    an instruction to move a pointer over a screen to a position stored in memory beforehand.

4. The configuring method as claimed in claim 1, wherein the method comprises defining a second instruction adapted to be executed by the computer, the second instruction being chosen from the third list via the human-machine interface, and wherein the method comprises defining an execution condition, at least one selected from the group consisting of the first instruction and the second instruction being adapted to be executed by a computer provided that the execution condition is validated.

5. The configuring method as claimed in claim 1, wherein the method further comprises:
    defining a non-binary second data signal able to be sent by the mouse, the second data signal being chosen from the first list via the human-machine interface,
    defining a second condition relating to the first data signal or to the second data signal, the second condition being chosen from the second list via the human-machine interface, and defining a second instruction adapted to be executed by the computer, the second instruction being chosen from the third list via the human-machine interface, and wherein the method comprises displaying, on a screen, a flowchart in which:
- at least one selected from the group consisting of the first data signal and the second data signal is represented by a first figure,
- at least one selected from the group consisting of the first condition and the second condition is represented by a second figure, and
- at least one selected from the group consisting of the first instruction and the second instruction is represented by a third figure.

6. The configuring method as claimed in claim 5, wherein the method comprises moving, over the screen, at least one selected from the group consisting of the first figure and the third figure, using the mouse.

7. The configuring method as claimed in claim 5, wherein the second figure is an arrow and wherein the method comprises creating the arrow using the mouse, a first end of the arrow being joined to the first figure, a second end of the arrow being joined to the third figure.

8. A method of using a mouse for a computer, the mouse comprising at least four non-binary degrees of freedom relative to at least four geometric axes and being adapted to transmit a non-binary data signal for each non-binary degree of freedom of the mouse, wherein the method comprises:
- storing a configuration of the mouse, wherein the configuration has been obtained using the configuring method as claimed in claim 1, and
- executing the at least one selected from the group consisting of the first instruction and the second instruction consecutively to the validation of the at least one selected from the group consisting of the first condition and the second condition.

9. A method of using a mouse for a computer, the mouse comprising at least four non-binary degrees of freedom relative to at least four geometric axes and being adapted to transmit a non-binary data signal for each non-binary degree of freedom of the mouse, wherein the method comprises:
- storing an identifier of a piece of software, and
- associating the identifier with a configuration of the mouse, wherein the configuration has been obtained using the configuring method as claimed in claim 1.

10. A computer system comprising a computer, a screen and a mouse comprising at least four non-binary degrees of freedom relative to at least four geometric axes and being adapted to transmit a non-binary data signal to the computer for each non-binary degree of freedom of the mouse, wherein the computer system comprises means for implementing a configuring method comprising:
- defining a non-binary first data signal adapted to be sent by the mouse, the first data signal being chosen from a first list via a human-machine interface, the human-machine interface,
- defining a first condition relating to the first data signal, the first condition being chosen from a second list via the human-machine interface, and
- defining a first instruction adapted to be executed by a computer, the first instruction being chosen from a third list via the human-machine interface.

11. The computer system as claimed in claim 10, wherein the mouse comprises at least two buttons.

12. The computer system as claimed in claim 11, wherein the mouse comprises a base and a top casing, wherein the base and the top casing are joined to each other by a joining device that permits the top casing to incline with respect to the base.

13. A non-transitory computer-readable storage medium having embodied thereon a computer-program comprising instructions that, when the program is executed by a computer, causes the computer to implement a method of configuring a mouse, the mouse comprising at least four non-binary degrees of freedom relative to at least four geometric axes and being adapted to transmit a non-binary data signal for each non-binary degree of freedom of the mouse, the configuring method comprising:
- defining a non-binary first data signal adapted to be sent by the mouse, the first data signal being chosen from a first list via a human-machine interface, the human-machine interface,
- defining a first condition relating to the first data signal, the first condition being chosen from a second list via the human-machine interface, and
- defining a first instruction adapted to be executed by a computer, the first instruction being chosen from a third list via the human-machine interface.

14. The configuring method according to claim 1, wherein the human-machine interface comprises a computer and a screen.

15. The computer system as claimed in claim 11, wherein the mouse comprises a lever that protrudes from a flank of the mouse and that is adapted to be actuated by a thumb of a user.

16. The computer system as claimed in claim 10, wherein the mouse comprises at least three buttons.

17. The computer system as claimed in claim 10, wherein the mouse comprises at least four buttons.

18. The computer system as claimed in claim 10, wherein the mouse comprises at least six non-binary degrees of freedom relative to at least six geometric axes.

19. The computer system as claimed in claim 18, wherein the mouse comprises a base and a top casing, wherein the base and the top casing are joined to each other by a joining device that permits the top casing to incline with respect to the base.

20. The computer system as claimed in claim 18, wherein the mouse comprises a lever that protrudes from a flank of the mouse and that is adapted to be actuated by a thumb of a user.

21. A method of configuring a mouse for a computer, the mouse comprising at least four degrees of freedom and being adapted to transmit one data signal for each degree of freedom of the mouse, the method comprising:
- defining a first data signal adapted to be sent by the mouse, the first data signal being chosen from a first list via a human-machine interface,
- defining a first condition relating to the first data signal, the first condition being chosen from a second list via the human-machine interface,
- defining a first instruction adapted to be executed by a computer, the first instruction being chosen from a third list via the human-machine interface, the method further comprising:
- defining a second data signal able to be sent by the mouse, the second data signal being chosen from the first list via the human-machine interface,
- defining a second condition relating to the first data signal or to the second data signal, the second condition being chosen from the second list via the human-machine interface, and defining a second instruction adapted to be executed by the computer, the second instruction being chosen from the third list via the human-machine interface, wherein the method comprises displaying, on a screen, a flowchart in which:

at least one selected from the group consisting of the first data signal and the second data signal is represented by a first figure, at least one selected from the group consisting of first condition and the second condition is represented by a second figure, and at least one selected from the group consisting of the first instruction and the second instruction is represented by a third figure.

22. The configuring method as claimed in claim 21, wherein the method comprises moving, over the screen, at least one selected from the group consisting of the first figure and the third figure, using the mouse.

23. The configuring method as claimed in claim 21, wherein the second figure is an arrow and wherein the method comprises creating the arrow using the mouse, a first end of the arrow being joined to the first figure, a second end of the arrow being joined to the third figure.

24. A method of using a mouse for a computer, the mouse comprising at least four degrees of freedom and being adapted to transmit one data signal for each degree of freedom of the mouse, wherein the method comprises:

storing a configuration of the mouse, wherein the configuration has been obtained using a configuring method comprising:

defining a first data signal adapted to be sent by the mouse, the first data signal being chosen from a first list via a human-machine interface, defining a first condition relating to the first data signal, the first condition being chosen from a second list via the human-machine interface, and defining a first instruction adapted to be executed by a computer, the first instruction being chosen from a third list via the human-machine interface, and executing the at least one selected from the group consisting of the first instruction and the second instruction consecutively to the validation of the at least one selected from the group consisting of the first condition and the second condition.

25. A method of using a mouse for a computer, the mouse comprising at least four degrees of freedom and being adapted to transmit one data signal for each degree of freedom of the mouse, wherein the method comprises:

storing an identifier of a piece of software, and associating the identifier with a configuration of the mouse, wherein the configuration has been obtained using a configuring method comprising:

defining a first data signal adapted to be sent by the mouse, the first data signal being chosen from a first list via a human-machine interface, defining a first condition relating to the first data signal, the first condition being chosen from a second list via the human-machine interface, and defining a first instruction adapted to be executed by a computer, the first instruction being chosen from a third list via the human-machine interface.

\* \* \* \* \*